Figure 1:
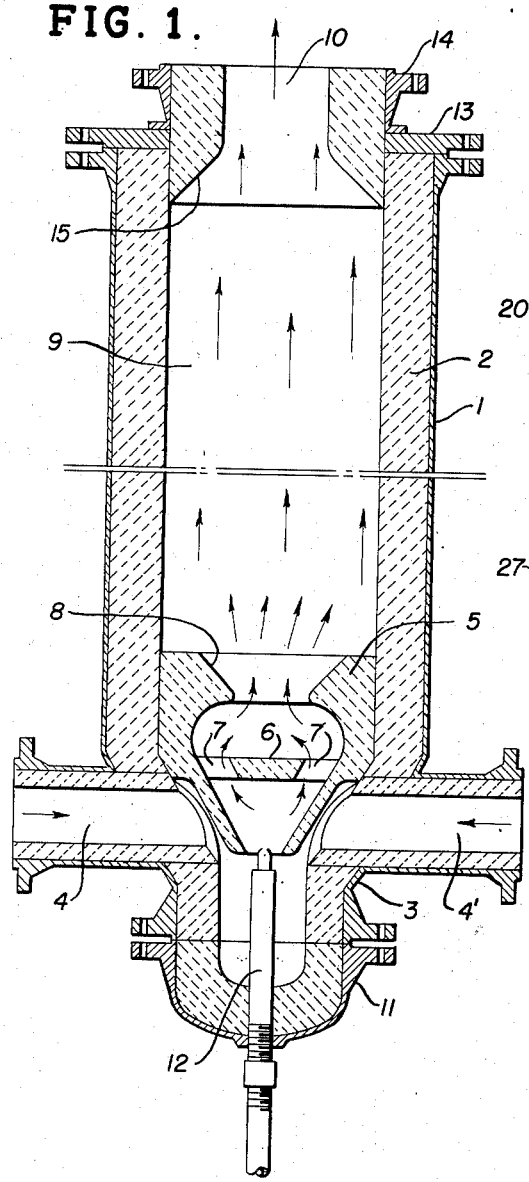

Nov. 27, 1951     W. R. KINNAIRD     2,576,228

AUTOTHERMIC CRACKING REACTOR

Filed July 30, 1949

INVENTOR:
William R. Kinnaird

By: *M. P. Vinema*
      Attorney

*Philip J. Liggett*
      Agent

Patented Nov. 27, 1951

2,576,228

UNITED STATES PATENT OFFICE 2,576,228

AUTOTHERMIC CRACKING REACTOR

William R. Kinnaird, Riverside, Ill., assignor to Universal Oil Products Company, Chicago, Ill., a corporation of Delaware Application July 30, 1949, Serial No. 107,702

7 Claims. (Cl. 23—277)

This invention relates to an improved type of reactor for use in effecting high temperature conversion operations, and more particularly to a reactor adapted for use in carrying out the oxidative or autothermic cracking of a gaseous hydrocarbon stream in admixture with a controlled oxygen or air stream.

The autothermic cracking of ethane, propane, butane, or other volatile hydrocarbons in admixture with air or oxygen provides a desirable process for the production of more valuable products. For example, propane in admixture with air may be cracked or reformed to make a supplementary fuel gas to meet emergency peak load demands from gas supplying companies. While for petro-chemical manufacturing companies, it may be desirable to crack ethane, or other economically available volatile stock, to produce a high yield of ethylene which in turn provides a desirable starting material for the manufacture of alcohol, anti-freeze mixtures, or various of the plastic materials.

There are various types of reactors or conversion chambers which have been used in connection with the oxidative or autothermic cracking of a gaseous reactant stream, but in general, present or prior types provide simple, elongated and baffled chambers wherein the reactant streams are gradually mixed as they pass therethrough, or alternately, chambers or reactors which are of a relatively complex construction having means for preheating one or more of the charge streams by indirect heat exchange with the product stream. The apparatus of the present invention provides an insulated or lined reaction chamber, having removable and improved means for rapidly mixing the reactant charge streams immediately upon their entering the conversion chamber.

It is therefor a principal object of the present invention to provide an insulated or refractory lined reactor chamber adapted for use with high temperature reactions and having positioned within the inlet end of the chamber a removable mixer or mixing member that is adapted to effect the rapid and intimate mixing of reactant streams.

It is also a particular object of this invention to provide a reactor adapted to rapidly mix and bring into contact two reactant streams which are normally maintained separate prior to their introduction into the conversion zone, as well as to provide means for lighting or igniting a combustible mixture in the start-up of an operation, such as where the particular reactor is used for oxidative or partial oxidation processing and the like.

It is a still further object of the invention to provide a reactor design and construction permitting easy accessibility to the interior thereof.

Broadly, the improved reactor of the present invention comprises in combination, an elongated pressure tight chamber having a refractory, high temperature resistant lining, reactant stream inlets at one end of the chamber, a reactant stream mixing member positioned within said chamber adjacent the reactant stream inlets, the mixing member having a baffled inlet thereto and restricted throat or passageway which is transverse to the reactant inlets and in addition a flared outlet section therefrom discharging axially into the interior of the elongated chamber, arcing or other ignition means extending into the interior of the chamber at the inlet end thereof, and product outlet means from the interior of the chamber.

More specifically, and in a desired embodiment of the apparatus, the reactant stream inlets directly oppose one another at the inlet end of the chamber, while the mixing member is positioned therebetween in a removable manner with the mixing member itself having a restricted passageway and inlet thereto which is out of alignment with the opposing reactant stream inlets to the chamber.

The size and proportions of the reactor and its reactant stream inlets, mixing section, and the like, of course depends upon the size of the conversion or processing unit in which the reactor is used and the corresponding quantities and flow rates of the particular charge streams to the reactor. It is, however, a feature of the present invention to provide rapid and intimate mixing of the reactant streams immediately upon their introduction to the reactor, so that an efficient operation, with high yields of the desired product or products are obtained from the particular processing operation.

For certain conversion operations, it may be desirable to provide a packing material within the reaction zone of the chamber following the mixing member or alternately, in conformance with one desired embodiment of the invention, an inner tubular member extending concentrically within the chamber itself, may be utilized to provide additional contacting surface within the interior of the chamber. As hereinbefore mentioned, it is a feature of the improved design and construction of this reactor to permit easy accessibility to the interior of the chamber as well as the easy assembly of the component parts of the reactant chamber.

Reference to the accompanying drawing and the following description thereof, will serve to further clarify the construction and arrangement of the improved reactor chamber of this invention, as well as indicate additional advantages obtained from its use in connection with high temperature conversion operations.

Figure 1 of the drawing is a diagrammatic sectional elevational view of one embodiment of the apparatus having the reactant stream inlets and the mixing section of the apparatus within the lower portion of the chamber.

Figure 2:
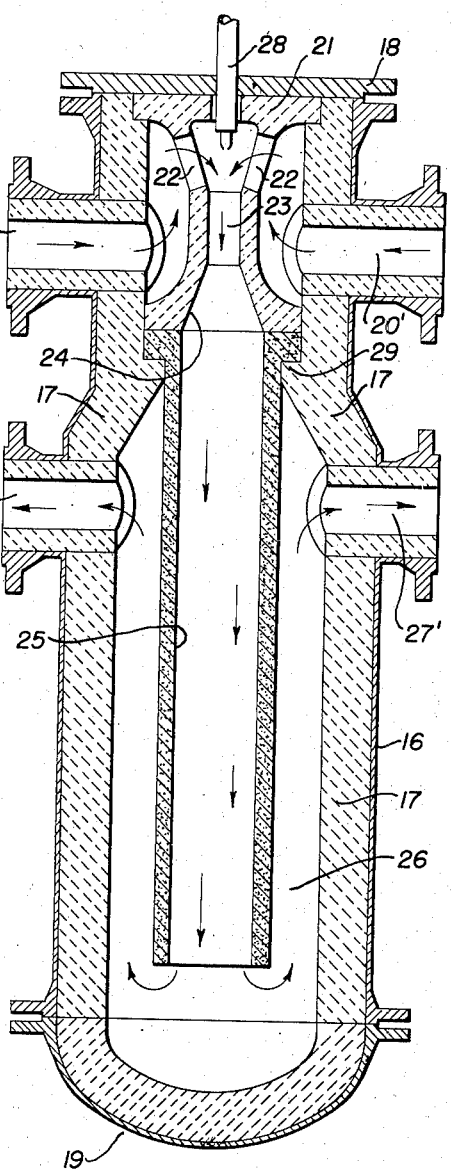

Figure 2 of the drawing also indicates in a sectional elevational view, a modified embodiment of the apparatus which has the reactant stream inlets and the mixing section positioned within the upper portion of the reactor chamber, and an elongated internally placed cylindrical tube providing an elongated restricted reaction section and a reversal in stream flow within the chamber, prior to the discharging of the product stream.

Referring now to Figure 1 of the drawing, there is shown a vertically disposed chamber 1 having an internal liner 2 of a refractory material suitable to withstand high temperatures. The liner may be haydite-lumnite insulating concrete, refractory tile, or a combination of block insulation and refractory tile, or any of the well-known high temperature resistant materials suitable to withstand high temperatures of the order of 1000° F. to 2500° F., depending upon the particular conversion to be carried out within the reactor.

In this embodiment, the chamber 1 is provided with a tapered or conically shaped lower portion 3 having a pair of opposing inlets 4 and 4' connecting therewith and discharging into a restricted inlet zone and having the lower portion of a mixing member 5 positioned therebetween. The lower portion of the mixing member 5 is of a frusto-conical shape with a restricted opening at the lower end thereof such that the reactant streams, charged by way of inlets 4 and 4', are caused to change flow direction and pass upwardly through the restricted opening into the interior of the mixing member 5. It is a feature of the present invention to have the mixing member 5 independent and removable from the reactor chamber, permitting its easy replacement or removal. Also in accordance with the present invention, the mixing section 5 has a restricted throat or passageway therethrough, which in this embodiment is provided with a baffle 6 that in turn forms passageways or orifices 7 whereby the mixed reactant streams are split and then again converged into a single stream prior to being discharged through the flared or Venturi like outlet portion 8 into the elongated reaction section 9 and to the product outlet 10 at the upper end of the chamber. The mixing member itself may be constructed of a high temperature resistant alloy metal or of a ceramic refractory material.

The lower end of the chamber has a removable head or cap portion 11 which in turn is provided with an insulating material as is the main portion of the chamber 1. The removable head or cap member 11 provides means for access to and inspection of the lower end of the mixing member 5, and it also supports a suitable arcing device 12, glow coil, or the like, which extends to the lower end of the mixing section and provides for the ignition of the reactant streams upon starting up the conversion operation.

The upper end of the reactor chamber is provided with a removable cover plate 13 which in turn is provided with a smaller diameter flanged outlet 14, or the like, suitable to provide for the product outlet 10 and the connection of a suitable conduit or other means for transferring the product stream to separation and recovery equipment. It may be noted, however, that the flange 14 has an internal diameter of not less than the inside diameter of the reaction section 9, such that the removable mixing member 5 may be placed within the mixing chamber or reactor. The size of the outlet opening 10 may be reduced by a suitable insulating material or refractory liner 15.

To illustrate the operation and use of the improved reactor in a conversion process, let it be assumed that an autothermic cracking operation is carried out with propane, ethane, or other volatile hydrocarbons, or mixture thereof, being converted in the presence of an air or oxygen-containing stream to produce a high yield of ethylene. In this conversion operation, a preheated air stream may be introduced by way of inlet 4, while preheated hydrocarbon gas is introduced by way of inlet 4'. Upon entering the reaction chamber, the reactant streams are baffled downwardly around the lower conical-skirt of the mixing member 5 and subsequently passed upwardly therethrough to become rapidly and intimately mixed. The resulting mixed stream being continuously introduced directly into the reaction zone 9 through the flared or Venturi like outlet opening 8 as provided by the mixing member 5.

There are in general two types of reactions that take place simultaneously within the mixing and reaction sections of an autothermic cracking reactor. A portion of the hydrocarbon stream combines with the oxygen containing stream in an exothermic reaction to provide heat which in turn is absorbed by the remaining portion of the hydrocarbon stream in an endothermic high temperature cracking reforming reaction, thus ethylene or other desired low molecular weight materials are formed within the reaction chamber. As hereinbefore noted, the efficiency of such conversion process depends upon proper preheating of the reactant stream, proper control of the proportions of the air and hydrocarbon stream, as well as upon rapid, intimate mixing of the streams immediately upon their introduction into the chamber and reaction zones. The design and construction of the present reactor is particularly suited to this latter requirement and provides the desired rapid mixing of the reactant streams. In some instances, it may be desirable to place a packing material, such as spheres or ball-like pieces of alumina, porcelain, Carborundum, or other refractory material within the reaction zone 9 to effect additional contacting and mixing of the charge streams, as for example, in the autothermic cracking process just described, the additional contacting surface is desirable to bring the products of the exothermic reaction into contact with the unreacted hydrocarbon vaporous material.

The embodiment of Figure 1 indicates the product outlet 10 to be directly upward in alignment with the reaction section, however, a side outlet may be provided in the entrance portion of the chamber within the scope of the present improved reactor. Also, the entire reactor may be inverted from the position shown in Figure 1, such that a downflow of the product stream is maintained, or alternately, the reactor may be placed in a horizontal position. Where a packing material is to be used within the reaction section, a downflow arrangement is preferable such that the spheres or packing may be maintained below and exterior of the mixing member 5, although, a screen or grid may be utilized in the embodiment of Figure 1 directly above the mixing member 5, in order to suitably hold and support the packing material.

Referring now to Figure 2 of the drawing, there is indicated a modified embodiment of the improved reactor of this invention, with an elongated chamber 16 being provided with a suitable refractory or insulating liner 17, a removable upper head 18 and a removable lower head 19. In this embodiment, the reactant stream inlets 20 and 20' are connected with the upper portion of the chamber 16 and the reactant streams being introduced therethrough are discharged into a restricted portion of the chamber having a mixing section or member 21 positioned between the inlets. In accordance with the present invention, the mixing section 21 has a portion thereof transferred to the path of the incoming reactant streams such that the latter are baffled through ports 22 into a restricted throat section 23, with the mixed stream being subsequently discharged through a flared opening 24 into an elongated internal reaction tube 25. The reactant streams are rapidly and intimately mixed within the restricted zone provided by the mixing member 21 such that an efficient conversion may take place within the elongated reaction zone, as provided by the internal tube 25. This embodiment provides for the resulting product stream from the end of the tube 25 to pass in reverse flow through an annular zone 26 provided between the exterior of the tube 25 and the inner liner 17. The product stream is thus ultimately discharged from the chamber by way of one or more outlets 27 and 27', which are within the upper portion of the unit, at the end of the annular passageway 26. Also, in accordance with the present invention, the mixing member 21 is designed and arranged to be removable from the interior of the reactant chamber, and in its normal position is placed between the inlets to the chamber in a member causing the reactant streams to pass transversely to the original direction of introduction with a mixed stream being subsequently discharged axially into the elongated reaction zone. In the embodiment of Figure 2, a shoulder or recessed portion 29 is provided by the upper portion of the liner 17, such that the tube 25 and the mixing member 21 may be supported thereon in a proper position.

A suitable arcing device, glow coil, or the like 28 is passed through the upper head 18 and the upper portion of the mixing member 21 such that it extends slightly into the path of the gases entering the mixing throat, whereby they may be ignited upon starting-up the processing operation.

As noted in connection with Figure 1 of the drawing, the reactor of Figure 2 may be inverted to have the inlets and mixing section at the lower end of the chamber, or alternately, the reactor placed in a horizontal position, for obviously, it is not intended to limit the use of the chamber to any particular position when used in connection with the processing system. The latter embodiment may also be used as indicated in connection with Figure 1 of the drawing, with suitable refractory spheres or the like placed therein to aid in providing additional mixing and contacting surface within the reaction zone. However, where a packing material is used, an internal tube, such as 25, may generally be eliminated, but when spheres are utilized and the concentric internal tube 25 eliminated, the product outlets 27 and 27' are preferably placed at the end opposite the inlet or lower end of the reactor as indicated, inasmuch as the reverse flow within the reaction section is also eliminated.

In summary, while the present improved reactors of this invention are particularly adapted to carry out autothermic cracking reactions with preheating of the reactant streams being effected externally of or prior to their introduction into the reactor, it is not intended to limit the apparatus to any one reaction or to autothermic cracking alone. The preferred construction of the reactor is, as indicated in both Figures 1 and 2 of the drawing, with the inlet section designed and constructed to have the reactant stream inlets placed in a diametrically opposing manner and at least a portion of the mixing member extending between the reactant stream inlets, such that the stream is baffled around and into an inlet portion of the mixing section. Further, the mixing member or section has a restricted or baffled throat portion which is aligned transversely to the original flow direction of the reactant streams, whereby there is a substantially reverse flow of the reactant streams, while the outlet portion of the mixing member is of a Venturi shape, permitting the resulting mixed stream to be introduced into a larger diameter and elongated reaction section of the apparatus, and the design and construction is such as to permit the placement and removal of the internally positioned mixing member, as well as other internal members, in an easy, readily accessible manner.

I claim as my invention:

1. A reactor for effecting the high temperature conversion of reactant streams, which comprises in combination, an elongated pressure tight chamber having an internal temperature resistant refractory lining, a pair of oppositely directed reactant stream inlets connected in alignment to one end of said chamber, a reactant stream mixing member positioned within said end of the chamber and having a wall portion between said oppositely directed inlets, said member having an inlet thereto and a restricted throat which is transverse to said reactant inlets with a flared outlet section discharging axially into the interior of said elongated chamber, ignition means extending into the interior of said chamber at the inlet end thereof, and product outlet means from said chamber.

2. The reactor of claim 1 further characterized in that the interior of said chamber has a packing of high temperature resistant refractory ball-like particles, and said product outlet means extends from the end of said chamber opposite said inlet means.

3. The reactor of claim 1 further characterized in that an internal cylindrically shaped refractory tube is positioned concentrically within said elongated chamber, and extends from said mixing member to within a short distance of the opposing end of said chamber, said internal refractory tube forming between the inner wall of said chamber and the exterior wall of said internal tube an annular passageway for a product stream, and said product outlet means connects with said annular passageway at the inlet end of said chamber, whereby said product stream passes axially through said internal tube and then reverses its direction within said annular passageway.

4. A reactor for effecting the high temperature conversion of reactant streams, which comprises in combination, an elongated pressure tight chamber having an internal high temperature resistant refractory lining, a pair of oppositely directed reactant stream inlets connected in alignment to one end of the chamber, a removable reactant stream mixing member having a portion thereof positioned between said pair of reactant stream inlets within said chamber, said mixing member having a restricted inlet and throat section therein that extends transversely to said reactant stream inlets and in alignment with said reaction chamber, with a flared Venturi shaped outlet from said mixing member discharging axially into the interior of said elongated chamber, removable ignition means extending through said chamber and into proximity with the inlet end of said mixing member, and product outlet extending from the interior of said elongated chamber.

5. The reactor of claim 4 further characterized in that said elongated pressure tight chamber has removable ends thereto, with said mixing member removably seated between said reactant stream inlets at the inlet end of said chamber, and the inlet to said mixing section is positioned out of alignment with said reactant stream inlets, whereby the flow of the reactant streams is substantially reversed in direction after entering said chamber and prior to being discharged from said mixing member into the interior of said elongated chamber.

6. The reactor of claim 5 still further characterized in that the interior of said chamber has a packing of high temperature resistant refractory ball-like particles, and said product outlet means extends from the end of said chamber opposite said inlet means.

7. The reactor of claim 5 still further characterized in that an internal cylindrically shaped refractory tube is positioned concentrically within said elongated chamber, and extends from said mixing member to within a short distance of the opposing end of said chamber, said internal refractory tube forming between the inner wall of said chamber and the exterior wall of said internal tube an annular passageway for a product stream, and said product outlet means connects with said annular passageway at the inlet end of said chamber, whereby said product stream passes axially through said internal tube and then reverses its direction within said annular passageway.

WILLIAM R. KINNAIRD.

REFERENCES CITED

The following references are of record in the file of this patent:

UNITED STATES PATENTS

| Number | Name | Date |
| --- | --- | --- |
| 1,671,448 | Plassmann | May 29, 1928 |
| 1,730,440 | Smith | Oct. 8, 1929 |
| 1,737,681 | Plassmann | Dec. 3, 1929 |
| 2,375,797 | Krejci | May 15, 1945 |